March 23, 1943.      S. B. KURZINA, JR      2,314,845
BACKPEDALING BRAKE FOR VELOCIPEDES
Original Filed July 31, 1940
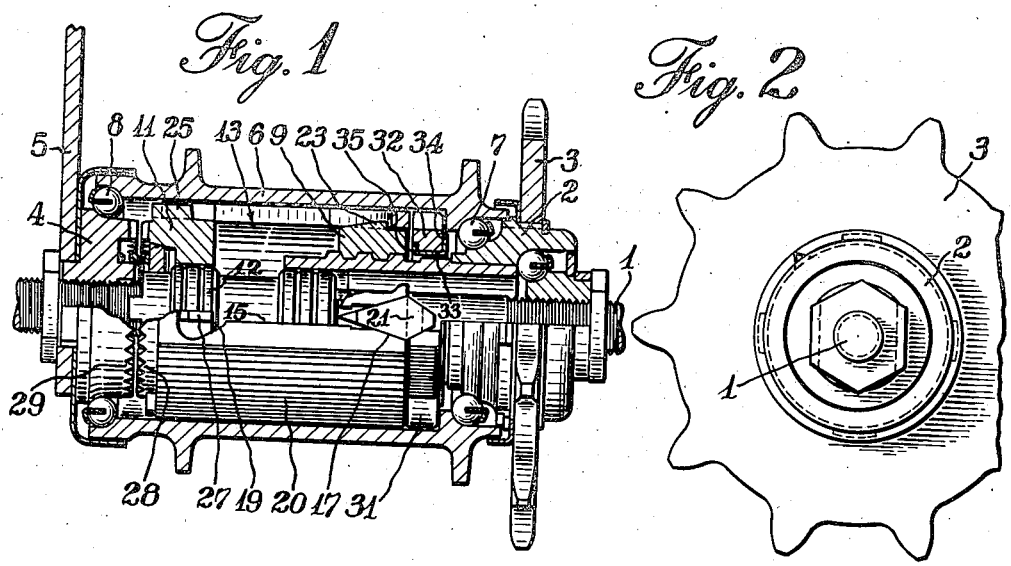
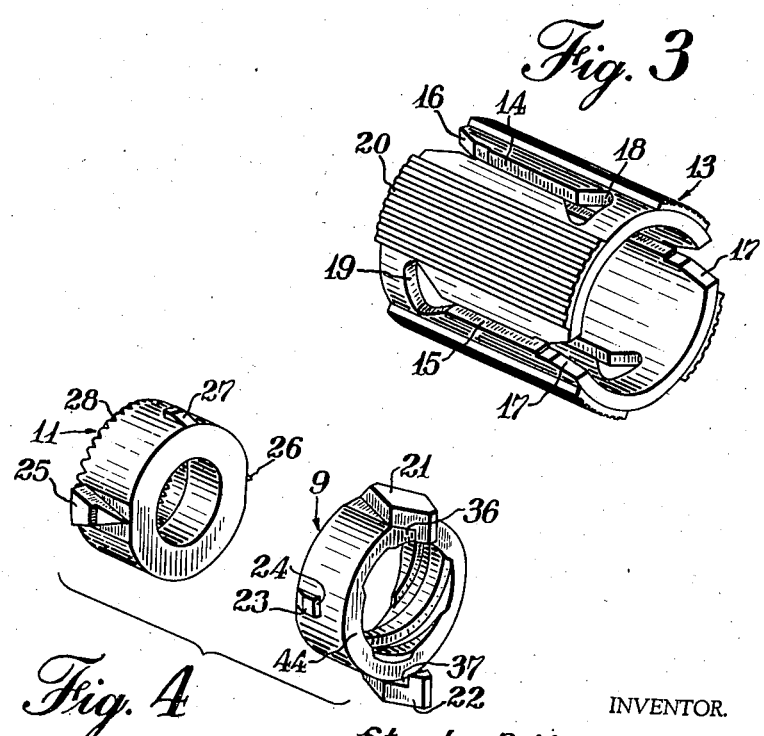
INVENTOR.
BY Stanley B. Kurzina Jr.
Clinton S. Janu
ATTY.
Witness:
Burr W. Jones Patented Mar. 23, 1943

2,314,845

UNITED STATES PATENT OFFICE 2,314,845

BACKPEDALING BRAKE FOR VELOCIPEDES

Stanley B. Kurzina, Jr., Elmira, N. Y., assignor to Bendix Aviation Corporation, South Bend, Ind., a corporation of Delaware Original application July 31, 1940, Serial No. 348,791. Divided and this application August 19, 1941, Serial No. 407,426

4 Claims. (Cl. 192—6)

The present invention relates to backpedaling brakes for velocipedes and more particularly to an improved brake actuating structure.

This application is a division of application Serial Number 348,791, filed July 31, 1940.

In that commercial form of backpedaling brake which is based on the teachings of the patent to Morrow No. 906,149, a slotted brake sleeve is expanded within a cylindrical hub by means of wedges entering the slots, while the sleeve is prevented from rotation by being clutched to an anchor member. The brake controlling members as heretofore constructed involve a number of machining operations which render the parts comparatively expensive. Moreover, they are kept in assembled relation with the brake sleeve by means of pins fixed in the controlling members and engaging in the closed ends of the slots in the brake sleeves, and these pins sometimes work loose and score the hub.

It is an object of the present invention to provide a novel backpedaling hub brake which is efficient in operation while being simple in construction and economical to manufacture.

It is another object to provide such a device in which the brake controlling members are unitary structures, all the parts of which are formed integrally on the body of the unit.

A further object is to provide such a device in which the brake member is provided with means for cutting through grease or oil in order to come into metal to metal contact with the interior of the hub.

Further objects and advantages will be apparent from the following description taken in connection with the accompanying drawing in which:

Fig. 1 is a side elevation partly in section and partly broken away showing a hub brake incorporating a preferred form of the invention;

Fig. 2 is an end view from the right in Fig. 1;

Fig. 3 is a detail in perspective of a brake sleeve according to the present invention; and Fig. 4 is a detail in perspective of a pair of brake actuating members incorporating a preferred form of the invention.

In Fig. 1 of the drawing there is illustrated a stationary axle 1, on one end of which is adjustably journalled a driving member 2, actuated by a sprocket 3, and on the other end of which is fixedly mounted an anchor member 4 held from rotation by a brake arm 5. A hollow cylindrical hub 6 is journalled on the driving and anchor members by means of bearings 7 and 8. A driving brake expanding member 9 is threaded on the driving member 2, an anchor brake expanding member 11 is journalled on the axle 1 by means of a bearing sleeve 12, and a brake member 13 in the form of a cylinder is mounted at its ends on said expanding members 9 and 11.

Brake sleeve 13 is provided with quadrantally arranged longitudinal overlapping slots 14 and 15, the open ends of which slots are flared as indicated at 16 and 17, and the closed ends of which are enlarged to form pear-shaped openings 18 and 19.

The surfaces between the slots 14 and 15 are arranged to engage in the interior of the hub 6 when the sleeve is expanded in order to apply a frictional braking effect thereto. Preferably, the braking surfaces are somewhat enlarged in diameter and may be formed integrally with the sleeve or by means of brake shoes rigidly attached thereto. As here shown, the braking surfaces are provided with longitudinal ribs 20 having sharp edges adapted to scrape lubricant from the interior of the hub so as to insure a metal to metal surface contact of the brake sleeve with the interior of the hub when the sleeve is expanded.

As best seen in Fig. 4, the driving brake expanding member 9 is provided with a pair of wedge lugs 21 and 22 which are adapted to engage in the flared portions 17 of slots 15 and expand the brake sleeve when the expander is forced into the sleeve. Expander 9 is also provided with beveled lugs 23 spaced 90° from the wedge lugs 21 and 22, and adapted to enter the pear-shaped openings 18 of slots 14 in the brake sleeve when the expander member 9 is introduced into the sleeve, the lugs having radial shoulders 24 adapted to engage the base of the pear-shaped openings and retain the expander 9 within the brake sleeve. The height of the lugs 23 is such that the brake sleeve 13 is sprung outward by the tapered surfaces 27 thereof when the expander is placed therein, and when the lugs enter the openings 18, the sleeve snaps down into interlocking engagement therewith.

In like manner, the anchor expander member 11 is provided with diametrically arranged wedge lugs 25 and 26 adapted to engage the flared ends 16 of slots 14, and tapered lugs 27 adapted to engage in the pear-shaped openings 19 to retain the anchor expander member in the sleeve.

The anchor brake expanding member 11 is provided with clutch teeth 28, and the anchor member 4 is provided with corresponding clutch teeth 29. When the driving expander member 9 is moved to the left in Fig. 1 by backward rotation of the driving member to apply the brake, the teeth 28 and 29 are caused to engage, thus immobilizing the anchor expander member 11.

Forward rotation of the driving member 2 is transmitted to the hub by means of a pair of arcuate clutch members 31 and 32 which are expanded into clutching engagement with the interior of the hub 6 by the wedge lugs 21 and 22 on the expander member 9 when forward rotation of the driving member causes said expander member to move to the right in Fig. 1.

Means for holding the clutch members 31, 32 in assembled relation is provided in the form of a ring 33 having radial flanges 34 and 35 embracing the clutch members. Wedge lugs 21 and 22 extend beyond the body of the expander member 9 and are provided with undercut grooves 36 and 37 in which flange 35 of ring 33 engages in order to enforce longitudinal movement of the ring and clutch members with the expander member 9.

Although but one form of the invention has been shown and described in detail, it will be understood that other forms are possible and that variations in the design and arrangements of the parts may be employed without departing from the spirit of the invention as defined in the claims appended hereto.

What is claimed is:

1. In a backpedaling hub brake for velocipedes, a wheel hub, a brake sleeve therein having overlapping longitudinal slots extending from each end thereof, and brake expanding members each loosely mounted in one end of the sleeve having radially extending wedge lugs adapted to enter the open ends of the slots and expand the sleeve, and having lugs with radial shoulders adapted to engage in the closed ends of the alternate slots to retain the members in the sleeve.

2. In a backpedaling hub brake for velocipedes, a wheel hub, a brake sleeve therein having overlapping longitudinal slots extending from each end thereof, and brake expanding members each loosely mounted in one end of the sleeve having radially extending wedge lugs adapted to enter the open ends of the slots and expand the sleeve, and having tapered lugs so dimensioned as to allow the brake sleeve to be forced over the tapered lugs and to snap on the expanding members with the tapered lugs entering the closed ends of the slots, and said tapered lugs having radial shoulders adapted to engage the end walls of the slots and retain the expanding member in the brake sleeve.

3. In a hub brake for velocipedes, an expansible brake sleeve having longitudinally grooved braking surfaces, and means for expanding the sleeve including a nut having beveled lugs formed on its outer surface, said sleeve having openings adapted to receive the lugs when the nut is pressed into the sleeve to thereby retain the nut in the sleeve, said nut also having wedge lugs adapted to engage and expand the sleeve.

4. A back-pedaling hub brake for velocipedes as set forth in claim 1 in which the surfaces of the brake sleeve between the longitudinal slots are provided with longitudinal ribs having scraping edges.

STANLEY B. KURZINA, JR.